United States Patent
Wada et al.

[11] Patent Number: 5,467,279
[45] Date of Patent: Nov. 14, 1995

[54] MOTOR-ASSISTED POWER STEERING CONTROL DEVICE

[75] Inventors: Shunichi Wada; Yasuo Naito; Kazuhisa Nishino; Masanori Takagi, all of Himeji, Japan

[73] Assignee: Mitsubishi Denki Kabushiki Kaisha, Tokyo, Japan

[21] Appl. No.: 51,545

[22] Filed: Apr. 26, 1993

[30] Foreign Application Priority Data

Apr. 27, 1992 [JP] Japan .................................. 4-107452
Apr. 27, 1992 [JP] Japan .................................. 4-107584

[51] Int. Cl.⁶ .................................................. B62D 5/04
[52] U.S. Cl. .................... 364/424.85; 180/79.1; 180/142
[58] Field of Search ................ 364/424.05; 180/79.1, 180/140, 141, 142; 280/91

[56] References Cited

U.S. PATENT DOCUMENTS

| | | | |
|---|---|---|---|
| 4,754,828 | 7/1988 | Morishita et al. | 180/79.1 |
| 4,800,975 | 1/1989 | Oshita et al. | 180/142 |
| 4,809,173 | 2/1989 | Fukami et al. | 364/424.05 |
| 4,961,474 | 10/1990 | Daido et al. | 180/79.1 |
| 4,979,114 | 12/1990 | Oshita et al. | 180/142 |
| 4,989,682 | 2/1991 | Takahashi et al. | 180/79.1 |
| 5,040,629 | 8/1991 | Matsuoka et al. | 180/141 |
| 5,151,860 | 9/1992 | Taniguchi et al. | 180/79.1 |
| 5,201,818 | 4/1993 | Nishimoto | 180/79.1 |
| 5,253,725 | 10/1993 | Nishimoto | 180/79.1 |
| 5,267,629 | 12/1993 | Mouri | 364/424.05 |

FOREIGN PATENT DOCUMENTS

| | | |
|---|---|---|
| 0350819 | 1/1990 | European Pat. Off. . |
| 0398238 | 11/1990 | European Pat. Off. . |
| 0522466 | 1/1993 | European Pat. Off. . |
| 3425389 | 2/1985 | Germany . |

*Primary Examiner*—Gary Chin
*Attorney, Agent, or Firm*—Sughrue, Mion, Zinn, Macpeak & Seas

[57] ABSTRACT

A motor for a motor-assisted power steering device is controlled with a control value which is obtained by detecting an error between an actual steering torque which has undergone phase lead compensation and a target steering torque, and by summing a proportional value, an integration value and a differentiation value of the error, or with a control value which is obtained by detecting an error between actual steering torque and a target torque; obtaining a proportional value, an integration value and a differentiation value of the error; clipping the lower limit value of the integration value with a first clipping circuit, and clipping the upper and lower limit values of motor-controlling quantity obtained by summing the proportional value, the integration value and the differentiation value by using a second clipping circuit.

1 Claim, 3 Drawing Sheets

MOTOR-ASSISTED POWER STEERING CONTROL DEVICE

FIELD OF THE INVENTION

The present invention relates to a motor-assisted power steering control device capable of obtaining a constant steering torque having smoothness and comfortableness by producing an auxiliary steering force depending on a steering force applied to a steering wheel.

BACKGROUND OF RELATED ART

In a conventional motor-assisted power steering control device disclosed in, for instance, Japanese Patent Application No. 287008/1988, a control quantity for a motor has been obtained by summing a correction quantity obtained by the differentiation value of an error value between a target control torque and an actual steering torque, and a basic auxiliary steering force which is determined on the basis of a steering torque applied when the steering wheel is operated and a target control torque.

In the conventional control device, however, there was no compensation to phase lag for the control quantity which was obtained by summing a correction quantity obtained by the differentiation of an error quantity and the basic auxiliary steering force, as described above. Accordingly, there were problems of limitation in the response characteristic and a cause of fine vibrations of the steering wheel.

SUMMARY OF THE INVENTION

It is an object of the present invention to provide a motor-assisted power steering control device capable of providing good response characteristic and realizing a stable feeling of steering operation.

In accordance with the present invention, there is provided a motor-assisted power steering control device which comprises a detecting means for detecting a steering torque of a steering wheel, a phase lead compensating means for compensating a phase lead of the detected steering torque, means for obtaining an error between the detected steering torque which has been compensated and a target steering torque, means for obtaining at least one among a proportional value, an integration value and a differentiation value on the error, a motor for generating an auxiliary steering torque of the steering wheel, and means for controlling the motor in response to the sum of the obtained values.

In accordance with a second embodiment of the present invention, there is provided a motor-assisted power steering control device which comprises a detecting means for detecting a steering torque of a steering wheel, means for obtaining an error between the detected steering torque and a target steering torque, means for obtaining a proportional value, an integration value and a differentiation value on the error, a motor for generating an auxiliary steering torque of the steering wheel, a first clipping means for determining the lower limit clipping value of the integration value as the lower limit value of an instruction voltage value or an instruction current value of the motor, a second clipping means for determining by clipping a control value obtained by summing a proportional value, an integration value and a differentiation value between the upper and lower limit values of the instruction voltage value or the instruction current value of the motor, and means for controlling the motor in response to the sum of the obtained values.

DETAILED DESCRIPTION OF THE PREFERRED EMBODIMENTS

Figure 1:
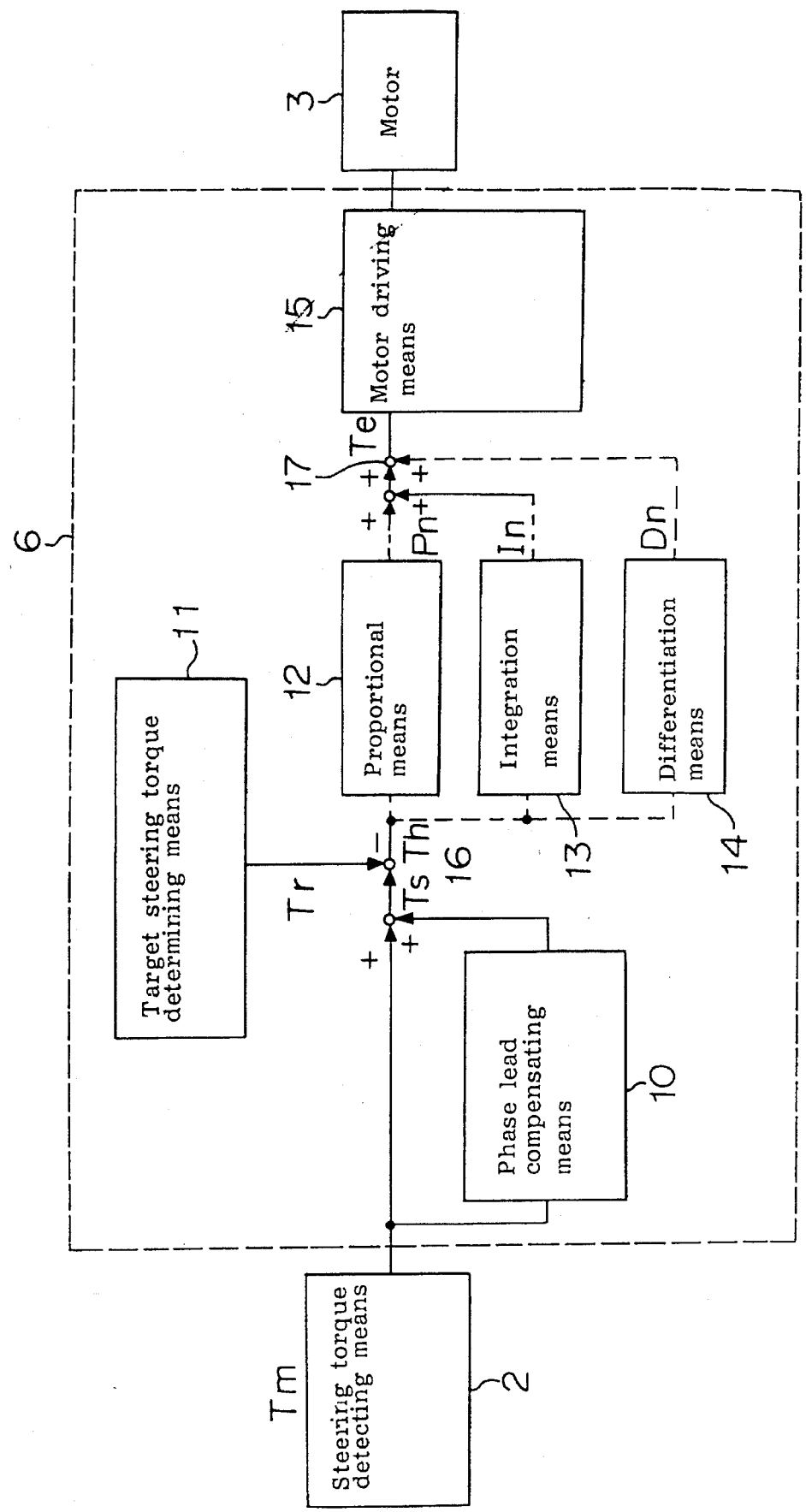
FIG. 1 is a block diagram of an embodiment of a control section of the motor-assisted power steering control device according to the present invention.

Referring to the drawings, the preferred embodiments of the present invention will be described.

Figure 2:
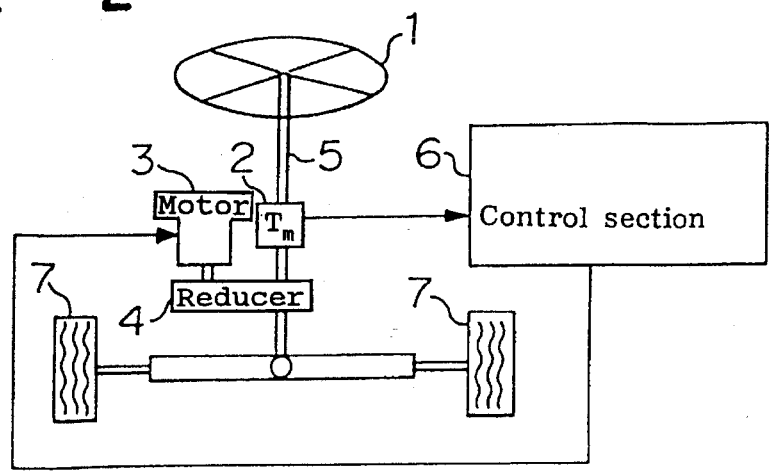
FIG. 2 is a diagram of the motor-assisted power steering control device of the present invention.

FIG. 2 shows a basic structure of the motor-assisted power steering control device of a first embodiment of the present invention. In FIG. 2, reference numeral 1 designates a steering wheel, numeral 2 designates a steering torque detecting means which produces an output corresponding to a steering force to the steering wheel 1, numeral 3 designates a motor which is connected to a steering shaft 5 by means of a speed reducing mechanism 4, numeral 6 designates a control section for calculating a control quantity from an output from the steering torque detecting means 2 to control the motor depending on the control quantity, and numeral 7 designates wheels.

FIG. 1 shows the construction of the control section 6 wherein numeral 10 designates a phase lead compensating means for compensating a phase lead of steering torque, numeral 11 designates a determining means for determining a target steering torque, numeral 12 designates a proportional means, numeral 13 designates an integration means, numeral 14 designates a differentiation means, numeral 15 designates a motor driving means, numeral 16 designates a subtracting means and numeral 17 designates an adding means.

The operation of the first embodiment will now be described.

When the steering wheel 1 is operated and a torque is applied to the steering shaft 5, a detection signal $T_m$ is produced from the steering torque detecting means 2. The phase lead compensating means 10 compensates a phase lag resulted from the inertia of, and friction in the motor 3 and the speed reducing mechanism 4. Let a steering torque after compensation be expressed as $T_s$, then the following equation is given:

$$T_s + T_{m(n)} + K_{D1}(T_{m(n)} - T_{m(n-1)})$$

where $K_{D1}$ is a differentiation coefficient.

The subtracting means 16 performs the calculation of $T_h = T_s - T_r$ where $T_h$ is an error and $T_r$ is a target steering torque. The error $T_h$ is calculated in the respective calculation means 12, 13, and 14 to obtain a proportional value $P_n$, an integration value $I_n$ and a differentiation value $D_n$ respectively. The equations to obtain such values are as follows.

$$P_n = K_p \times T_h$$

$$I_n = K_1 \times T_h + I_{n-1} \quad (0 \leq I_n \leq \alpha)$$

$$D_n = K_{D2} \times (T_{h(n)} - T_{h(n-1)})$$

where $K_p$, $K_1$ and $K_{D2}$ are a proportional coefficient, an integration coefficient and a differentiation coefficient respectively and n-1 represents a calculated value obtained in the last calculation period. The value $I_n$ is clipped with an appropriate value α. Then, a value of at least one among $P_n$, $I_n$ and $D_n$ is obtained by means of the adding means 17, whereby a control value Te to the motor 3 can be obtained from the following equation:

$T_e = P_n + I_n + D_n$ (This is the case when $P_n$, $I_n$ and $D_n$ are summed.)

The control value $T_e$ is outputted to the motor driving means 15 whereby the optional auxiliary steering force is produced in the motor 3, and the auxiliary steering force is applied to the steering shaft 5 by means of the speed reducing mechanism 4.

Figure 3:
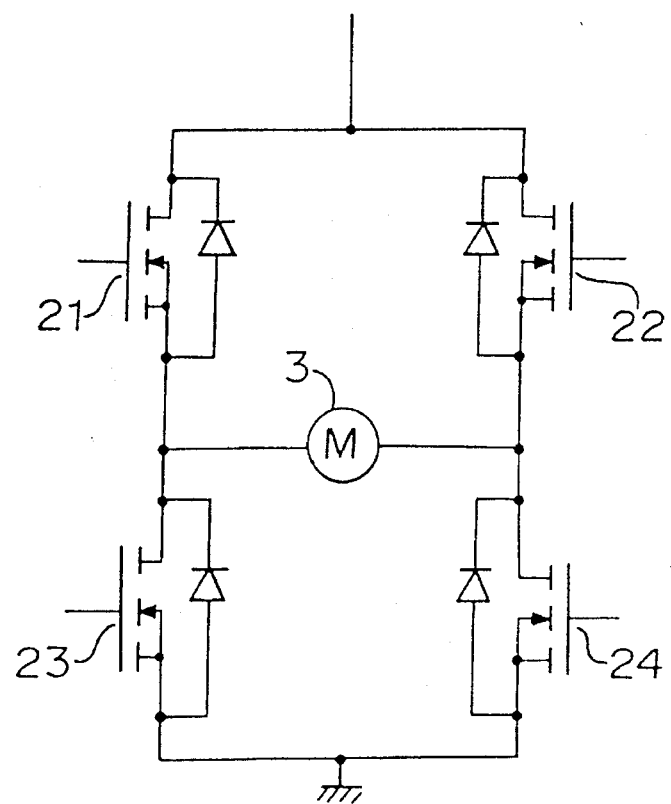
FIG. 3 is a diagram showing an embodiment of a motor driving means for the present invention.

For the motor driving means 15, an H bridge circuit as described in Japanese Patent Application No. 246191/1988 is used. The H bridge circuit is shown in FIG. 3 wherein numeral 21 through 24 designate transistors. Transistors 21 and 22 change the control value $T_e$ into a duty ratio of pulse width modulation (PWM). The maximum value of $T_e$ produces an output of 100% duty. When $T_e$ is 0 or lower, the motor 3 is not driven.

In the above-mentioned embodiment, a complete differentiation is used for the calculation of the phase lead compensation and calculation of differentiation. However, the same effect can be obtained by using an incomplete differentiation (lead and lag of phase) in consideration of effect by noises. Further, the calculation performed may be a digital operation or an analogue operation. A voltage value or a current value of the motor 3 may be used for the control quantity of the motor 3. Further, a feed-back minor loop may be used for controlling the current of the motor 3.

Thus, in accordance with the first embodiment of the present invention, the response characteristic of the steering system can be improved by effecting phase lead compensation for a steering torque detected and controlling a motor depending on an error between the steering torque which has undergone the phase lead compensation and a target steering torque. Further, a proportional value, an integration value and a differentiation value of the error are used for a control value for the motor so as to correspond to the target control torque.

A second embodiment of the present invention will now be described.

The basic structure of the motor-assisted power steering control device according to the second embodiment is the same as that of the first embodiment shown in FIG. 2.

Figure 4:
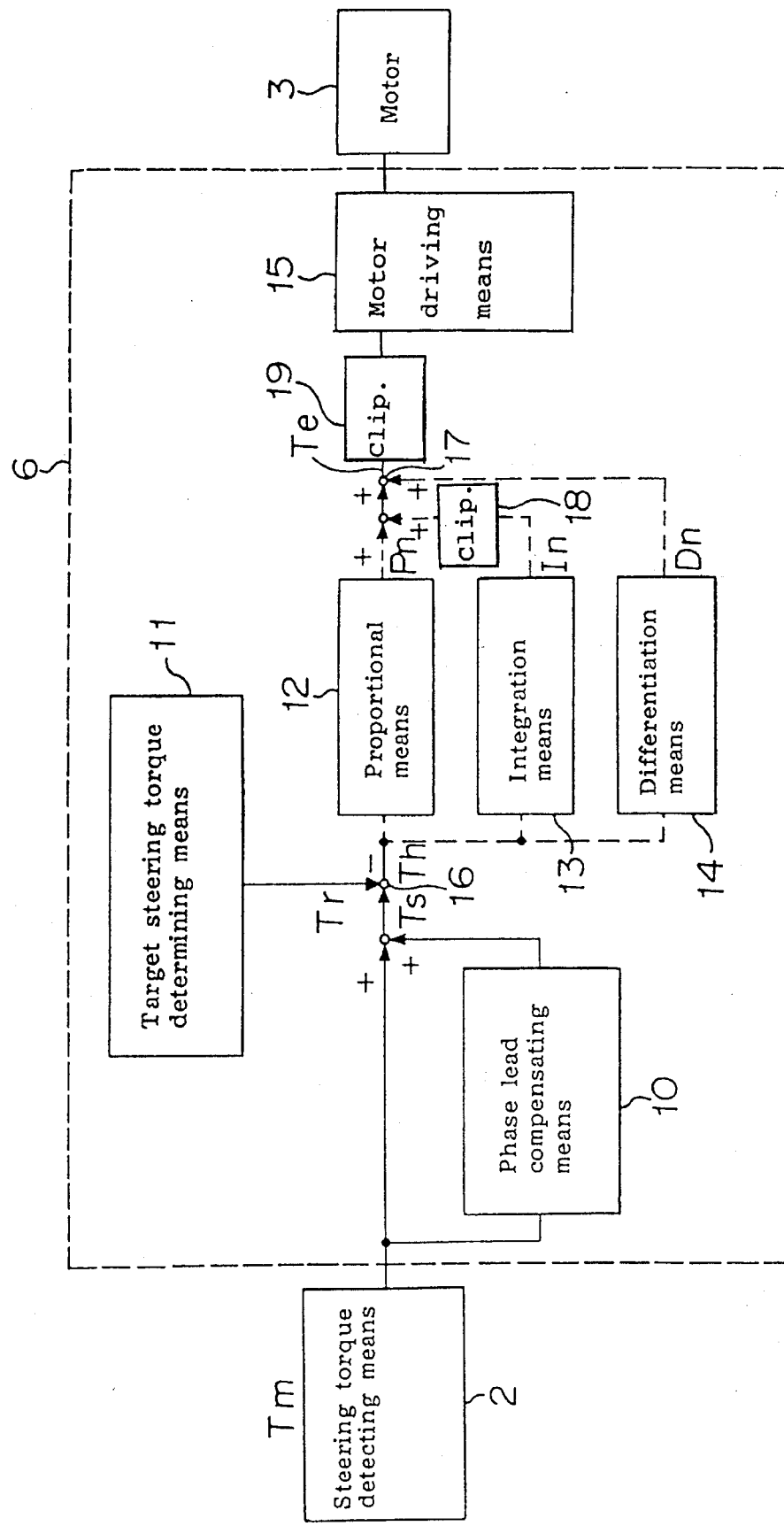
FIG. 4 is a block diagram of another embodiment of the control section for the motor-assisted power steering control device according to the present invention.

FIG. 4 shows a structure of a control section of the second embodiment. In FIG. 4, the same reference numerals as in FIG. 1 designate the same or corresponding parts, and accordingly, description of these parts is omitted. The control section is further provided with first and second clipping means 18, 19.

The operation of the second embodiment will now be described.

When the steering wheel 1 is operated, and a torque is applied to the steering shaft 5, a detection signal $T_m$ is outputted from the steering torque detecting means 2. The phase lead compensating means 10 is to compensate a phase lag caused by the inertia of and friction in the motor 3 and the associated speed reducing mechanism 4. When a steering torque after compensation is expressed as $T_s$ and a target torque is expressed as $T_r$, the subtracting means 16 calculates an error $T_h$ by using a formula $T_h = T_s - T_r$. The thus obtained error $T_h$ is calculated in respective calculating means 12, 13 and 14 to obtain a proportional value $P_n$, an integration value $I_n$ and a differentiation value $D_n$ in accordance with the following equations:

$P_n = K_p \times T_h$ $I_n = K_1 \times T_h + I_{n-1}$ $D_n = K_D \times (T_{h(n)} - T_{h(n-1)})$ where $K_p$, $K_1$ and $K_D$ are respectively a proportional coefficient, an integration coefficient and a differentiation coefficient, and n-1 expresses a calculated value obtained in the last calculation period. The integration value is clipped within upper and lower limit values by means of the first clipping means 18. The lower limit value is rendered to be the lower limit value for the control value to the motor 3, i.e., the lower limit value for a duty instruction value for PWM control, the lower limit value being, for instance, zero. The upper limit value is determined to be, for instance, 250.

Then, at least one among values $P_n$, $I_n$ and $D_n$ is obtained by the adding means 17 to thereby obtain a control value $T_e$ for the motor 3. Namely, $T_e = P_n + I_n + D_n$ (this is the case when all $P_n$, $I_n$ and $D_n$ are summed). The control value $T_e$ is also clipped within upper and lower limit values by means of the second clipping means 19. For instance, the upper limit value is a maximum value of 250 in PWM of the motor instruction value, and the lower limit value is a minimum value of zero. The control value $T_e$ is outputted to the motor driving means 15, whereby the optimum auxiliary steering force is produced in the motor 3. Accordingly, the integration value $I_n$ is forced to assume the value zero of a negative value in a region of a steering torque signal $T_s$ being lower than a target steering torque $T_r$; hence, the control value assumes zero. Therefore, the motor 3 is not assisted at all. The motor 3 is assisted as soon as $T_s$ exceeds $T_r$. Accordingly, it is possible to avoid a lag in control at the time of starting assistance in a case that the steering wheel 1 is operated from a state of small torque. Further, with the integral means 13, a steady variation to the target steering torque $T_r$ can be eliminated, and the target steering torque characteristic can be obtained without a lag.

In the second embodiment, a digital operation is conducted. However, an analogue operation may be used. Further, for the control quantity to the motor, voltage (PWM instruction value) applied thereto is used. However, it is possible to use a current instruction value wherein a target current of the motor is feed-back within a range from the lower limit value (e.g., zero) to the maximum limit value (e.g., 250), or an instruction value of a current feed-back minor loop.

In the second embodiment, there is no assist to the motor in a case that an integration value and a control quantity to the motor do not assume a negative value but a minimum value when a steering torque is lower than a target steering torque. On the other hand, when the steering torque exceeds the target value, control of assistance is immediately started. Accordingly, the response characteristic is improved. Further, an integration means can eliminates a steady variation. In addition, since the control value for the motor has a upper limit value, the convergence property can be improved.

We claim:

1. A motor-assisted power steering control device which comprises:

a detecting means for detecting a steering torque of a steering wheel, means for obtaining an error between the detected steering torque and a target steering torque, means for obtaining a proportional value, an integration value and a differentiation value of the error, a motor for generating an auxiliary steering torque of the steering wheel, a first clipping means for determining a lower limit clipping value of the integration value as the lower limit value of an instruction voltage value or an instruction current value of the motor, a second clipping means for clipping a control value obtained by summing said proportional value, said integration value and said differentiation value according to upper and lower limit values of the instruction voltage value or the instruction current value of the motor, and means for controlling the motor in response to the clipped control value.

* * * * *